(12) United States Patent
Schroeder

(10) Patent No.: US 6,626,475 B2
(45) Date of Patent: Sep. 30, 2003

(54) TRAILER-MOUNTED, SIDE ENTRY BAR APPARATUS

(76) Inventor: Neal W. Schroeder, 245 County Rd. 153, Moulton, AL (US) 35650

( * ) Notice: Subject to any disclaimer, the term of this patent is extended or adjusted under 35 U.S.C. 154(b) by 0 days.

(21) Appl. No.: 10/102,769

(22) Filed: Mar. 21, 2002

(65) Prior Publication Data

US 2002/0149230 A1 Oct. 17, 2002

Related U.S. Application Data

(60) Provisional application No. 60/283,402, filed on Apr. 13, 2001.

(51) Int. Cl.[7] ............................................. B60R 19/42
(52) U.S. Cl. ...................... 293/126; 296/181; 296/188; 296/35.2
(58) Field of Search ................................. 296/181, 182, 296/187, 188, 35.2; 293/126

(56) References Cited

U.S. PATENT DOCUMENTS

| 357,800 | A | * | 2/1887 | Wescott | ....................... 293/128 |
|---|---|---|---|---|---|
| 4,060,268 | A | * | 11/1977 | Page, Jr. | ..................... 293/128 |
| 4,527,826 | A | * | 7/1985 | O'Neal | ..................... 105/238.1 |
| 4,545,611 | A | | 10/1985 | Broadbent | |
| 4,693,650 | A | | 9/1987 | Smith | |
| 4,738,575 | A | * | 4/1988 | Blodgett et al. | ............. 296/181 |
| 4,772,063 | A | * | 9/1988 | Amy | ........................... 224/401 |
| 4,898,418 | A | | 2/1990 | Lind, Sr. | |
| 4,938,524 | A | | 7/1990 | Straub et al. | |
| 4,981,318 | A | * | 1/1991 | Doane et al. | ................ 296/181 |
| 5,026,112 | A | | 6/1991 | Rice | |
| 5,209,540 | A | * | 5/1993 | Metler | ........................ 105/370 |
| H1660 | H | * | 7/1997 | Herman et al. | ............. 15/340.1 |
| 5,823,586 | A | * | 10/1998 | Marley | ........................ 280/851 |

* cited by examiner

*Primary Examiner*—D. Glenn Dayoan
*Assistant Examiner*—Patricia Engle

(57) ABSTRACT

A side entry bar apparatus is provided for mounting on a bottom of a trailer and prevents or bars a motor vehicle from entering the space under the floor of the trailer from the side of the trailer. The apparatus includes a plurality of vertically oriented support bars, a plurality of longitudinally and horizontally oriented support bars, and a plurality of transversely and horizontally oriented support bars. The respective bars are connected together, such as by welding, to form a rigid cage structure. A plurality of trailer attachment plates are connected to the respective top ends of the vertically oriented support bars to attach the cage structure to the bottom of the trailer.

4 Claims, 3 Drawing Sheets

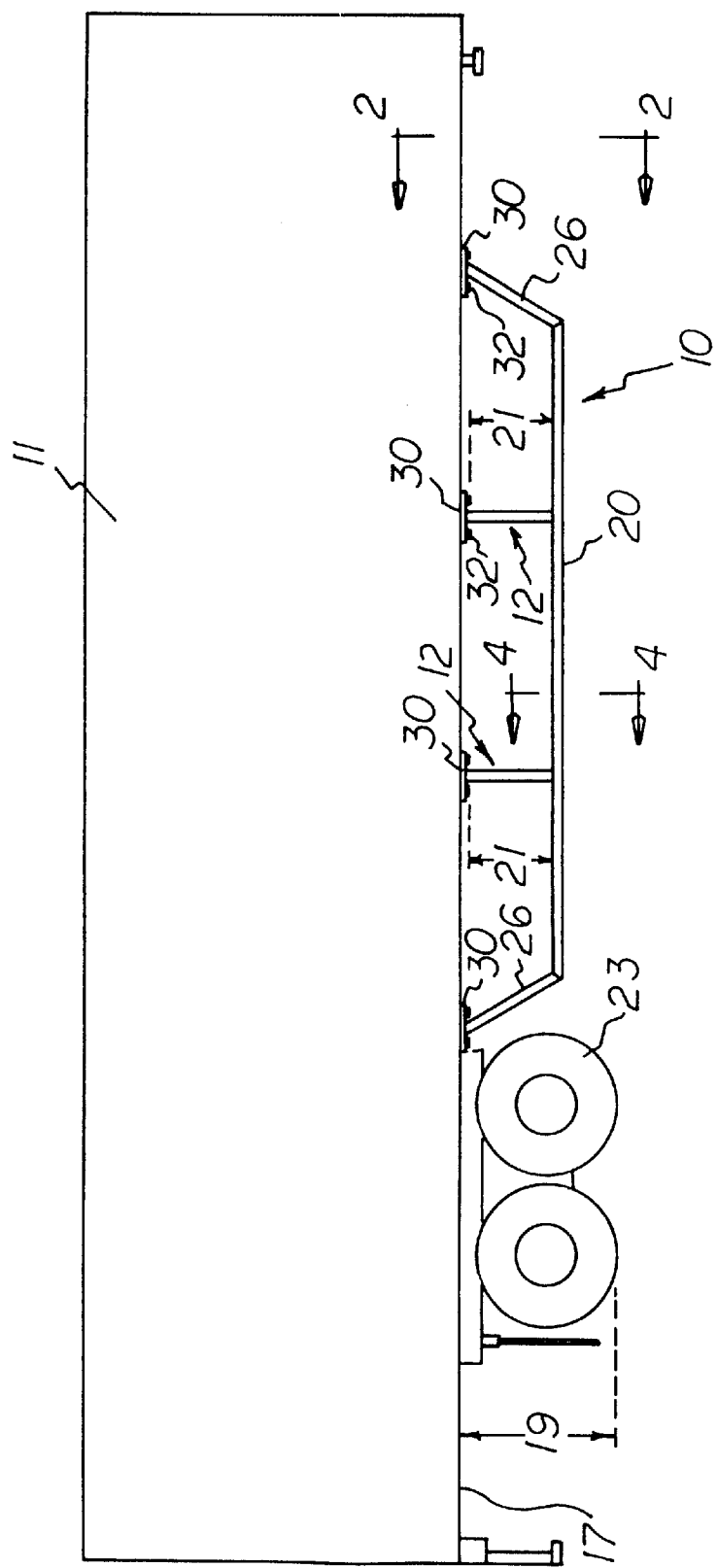

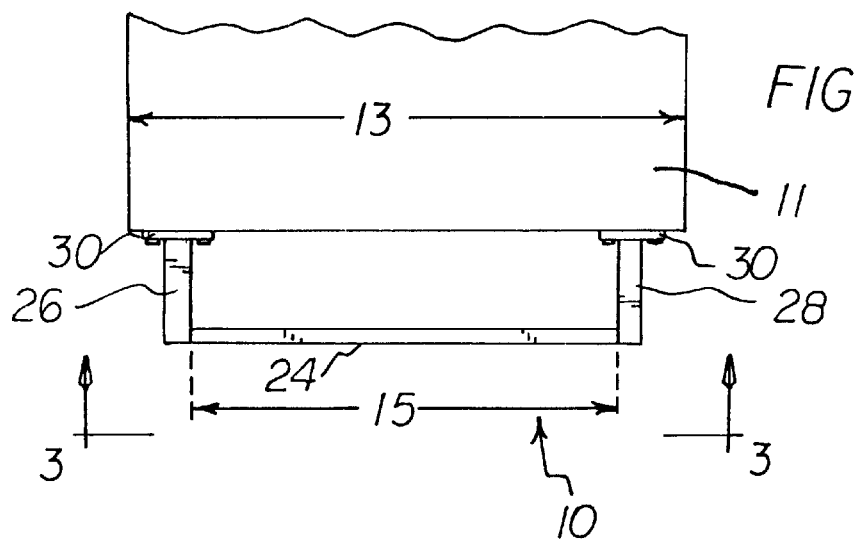
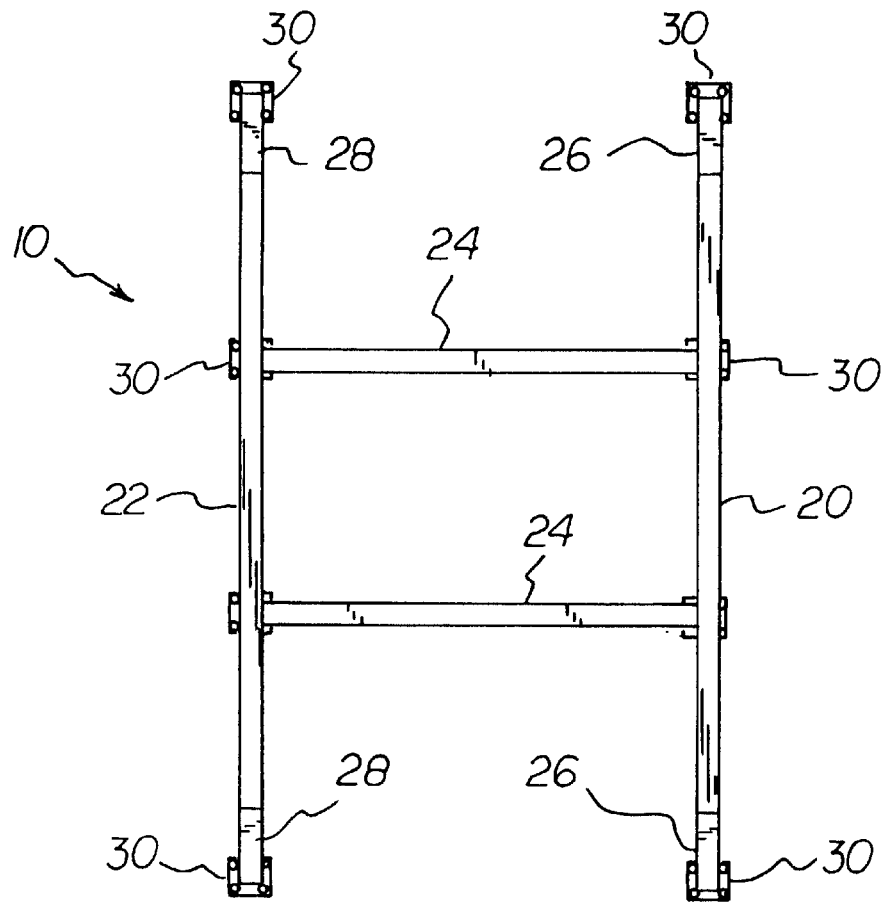

TRAILER-MOUNTED, SIDE ENTRY BAR APPARATUS

CROSS-REFERENCE TO RELATED APPLICATION

This application claims priority based upon my copending Provisional Application Serial No. 60/283,402, filed Apr. 13, 2001.

BACKGROUND OF THE INVENTION

1. Field of the Invention

The present invention relates generally to trailers pulled by tractor trucks and, more particularly, to trailers having a trailer single bottom floor that extends from the front of the trailer to the rear of the trailer.

2. Description of the Prior Art

Trailers that are pulled by tractor trucks are well known in the art. Throughout the years, a number of innovations have been developed relating to such trailers, and the following U.S. patents are representative of some of those trailer innovations: U.S. Pat. Nos. 4,545,611, 4,693,650, 4,898,418, 4,938,524, and 5,026,112.

Before discussing the above-cited patents, an important issue relating to trailers will be mentioned. Tragic motor vehicle accidents commonly occur between passenger automobiles and trailers. One type of accident occurs when the passenger automobile crashes into the side of a trailer and part of the passenger automobile moves under the trailer. This can be especially tragic because the body of the trailer may shear off the top of the passenger automobile when the passenger automobile moves under the trailer. In this respect, it would be desirable if a trailer were provided with means to prevent or bar a passenger automobile from sliding under the trailer during a crash between a passenger automobile and the trailer.

Turning to the above-cited patents, U.S. Pat. No. 4,545,611 discloses a trailer van body which includes pleated sides. However, no provision is made to prevent or bar a vehicle from being driven under the van body.

U.S. Pat. No. 4,693,650 discloses a trailer apparatus for transporting vehicles and other cargo. There are two bottom floors levels for the trailer. The first bottom floor level is present at the rear of the trailer, over the wheels, and is also present at the front of the trailer, over the means for attaching the trailer to a tractor truck. A second bottom floor level in present in the middle of the trailer, between the front and rear of the trailer. The second floor level is closer to the ground than the first floor level. The position of the second floor level effectively prevents a vehicle from moving under the trailer in the event of a crash between a passenger automobile and the trailer. However, many trailers that are currently in use do not have a middle portion that is closer to the ground than the front and rear portions of the trailer. In this respect, it would be desirable if a trailer that has a single floor level could be modified to provide a barrier that extends below the middle portion of the trailer to prevent a vehicle from being driven under the trailer.

U.S. Pat. No. 4,898,418 discloses a tri-level refrigerated trailer in which two bottom floor levels are disclosed. The bottom portion of the middle portion of the trailer is lower than the bottom portion of the trailer over the trailer wheels. In this respect, this patent is similar to U.S. Pat. No. 4,693,650 discussed above.

U.S. Pat. No. 4,938,524 discloses a trailer gooseneck and curtain side improvements which include a single curved plate at the front of the trailer and twin girders extending substantially longitudinally the length of the trailer. The curtain side improvements are designed to withstand air resistance. However, the side improvements are not designed to withstand an impact of a vehicle that crashes into the side of the trailer. In this respect, it would be desirable if the side curtain of a trailer were designed to withstand the impact of a vehicle that crashes into the side of the trailer.

U.S. Pat. No. 5,026,112 discloses a trailer that has removable side panels. An additional storage area is located below the bottom floor of the middle of trailer. However, the storage area below the middle of the trailer is not designed to withstand the impact of a vehicle that crashes into the side of the trailer. More specifically, the storage area below the middle of the trailer is not designed to prevent a passenger automobile from moving under the trailer in the event of a crash between the passenger automobile and the trailer.

Still other features would be desirable in a trailer-mounted, side entry bar apparatus. When a passenger automobile crashes into the side of a trailer, the force of impact is received in a substantially transverse direction with respect to the longitudinal direction of the trailer. In this respect, to prevent the passenger automobile from moving under the trailer, it would be desirable if transversely oriented members were provided to resist a vehicle from moving under the trailer in a transverse direction.

Also, to provide wide applicability of a trailer-mounted, side entry bar apparatus, it would be desirable if a trailer-mounted, side entry bar apparatus were provided that is easily retrofitted to a conventional trailer. In this respect, it would be desirable if a trailer-mounted, side entry bar apparatus includes elements that facilitate retrofitting to a conventional trailer.

Thus, while the foregoing body of prior art indicates it to be well known to have structures which depend downward from the middle of a trailer floor, the prior art described above does not teach or suggest a trailer-mounted, side entry bar apparatus which has the following combination of desirable features: (1) is provided with means to prevent or bar a passenger automobile from sliding under the trailer during a crash between a passenger automobile and the trailer; (2) has provisions for modifying a trailer that has a single floor level to provide a barrier that extends below the middle portion of the trailer to prevent a vehicle from being driven under the trailer; (3) provides a side curtain of a trailer which is designed to withstand the impact of a vehicle that crashes into the side of the trailer; (4) includes transversely oriented members to resist a vehicle from moving under the trailer in a transverse direction; (5) is easily retrofitted to a conventional trailer; and (6) includes elements that facilitate retrofitting to a conventional trailer. The foregoing desired characteristics are provided by the unique trailer-mounted, side entry bar apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a side entry bar apparatus for mounting on a bottom of a trailer and includes a first set of a plurality of first vertically oriented support bars, each of which has a top end and a bottom end. A first longitudinally and horizontally oriented support bar is connected to the respective bottom ends of the first vertically oriented support bars. A second set of a plurality of second vertically oriented support bars are provided, each of which has a top end and a bottom end. A second longitudinally and horizontally oriented support bar is connected to the respective bottom ends of the second vertically oriented support bars. A plurality of transversely and horizontally oriented support bars are connected between the first longitudinally and horizontally oriented support bar and the second longitudinally and horizontally oriented support bar. A plurality of trailer attachment plates are connected to the respective top ends of the first vertically oriented support bars and the second vertically oriented support bars. The respective support bars are connected together to form a rigid cage structure.

The trailer has a trailer width, and the transversely and horizontally oriented support bars have a transverse bar length which is less than the trailer width.

The bottom of the trailer floor is spaced above the ground by a trailer floor height. The first vertically oriented support bars and the second vertically oriented support bars have a vertical bar height, and the vertical bar height is less than the trailer floor height.

A first set of a plurality of first obliquely oriented support bars can also be provided, each of which has a top end and a bottom end. Bottom ends of the first obliquely oriented support bars are connected to opposite ends of the first longitudinally and horizontally oriented support bar. A second set of a plurality of second obliquely oriented support bars can also be provided, each of which has a top end and a bottom end. Bottom ends of the second obliquely oriented support bars are connected to opposite ends of the second longitudinally and horizontally oriented support bar. A plurality of additional trailer attachment plates are connected to the respective top ends of the first obliquely oriented support bars and the second obliquely oriented support bars.

The trailer attachment plates include bolt reception channels, and the trailer attachment plates can be attached to bottom portions of the trailer using attachment bolts that are threaded through the bolt reception channels.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved trailer-mounted, side entry bar apparatus which has all of the advantages of the prior art and none of the disadvantages.

It is another object of the present invention to provide a new and improved trailer-mounted, side entry bar apparatus which may be easily and efficiently manufactured and marketed.

It is a further object of the present invention to provide a new and improved trailer-mounted, side entry bar apparatus which is of durable and reliable construction.

An even further object of the present invention is to provide a new and improved trailer-mounted, side entry bar apparatus which is susceptible of a low cost of manufacture with regard to both materials and labor, and which accordingly is then susceptible of low prices of sale to the consuming public, thereby making such trailer-mounted, side entry bar apparatus available to the buying public.

Still yet a further object of the present invention is to provide a new and improved trailer-mounted, side entry bar apparatus which is provided with means to prevent or bar a passenger automobile from sliding under the trailer during a crash between a passenger automobile and the trailer.

Still another object of the present invention is to provide a new and improved trailer-mounted, side entry bar apparatus that has provisions for modifying a trailer that has a single floor level to provide a barrier that extends below the middle portion of the trailer to prevent a vehicle from being driven under the trailer.

Yet another object of the present invention is to provide a new and improved trailer-mounted, side entry bar apparatus which provides a side curtain of a trailer which is designed to withstand the impact of a vehicle that crashes into the side of the trailer.

Even another object of the present invention is to provide a new and improved trailer-mounted, side entry bar apparatus that includes transversely oriented members to resist a vehicle from moving under the trailer in a transverse direction.

Still a further object of the present invention is to provide a new and improved trailer-mounted, side entry bar apparatus which is easily retrofitted to a conventional trailer.

Yet another object of the present invention is to provide a new and improved trailer-mounted, side entry bar apparatus that includes elements that facilitate retrofitting to a conventional trailer.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a side view showing a preferred embodiment of the trailer-mounted, side entry bar apparatus of the invention that is mounted on a trailer.

FIG. 2 is a front view of the embodiment of the trailer-mounted, side entry bar apparatus shown in FIG. 1 taken along line 2—2 of FIG. 1.

FIG. 3 is a bottom view of the embodiment of the trailer-mounted, side entry bar apparatus of FIG. 1.

DESCRIPTION OF THE PREFERRED EMBODIMENT

With reference to the drawings, a new and improved trailer-mounted, side entry bar apparatus embodying the principles and concepts of the present invention will be described.

Figure 4:
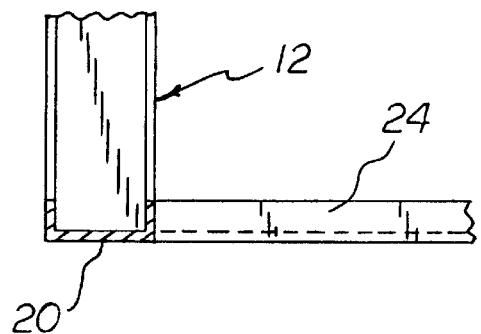
FIG. 4 is an enlarged partial cross-sectional view of the embodiment of the invention shown in FIG. 1 taken along line 4—4 thereof.
Figure 5:
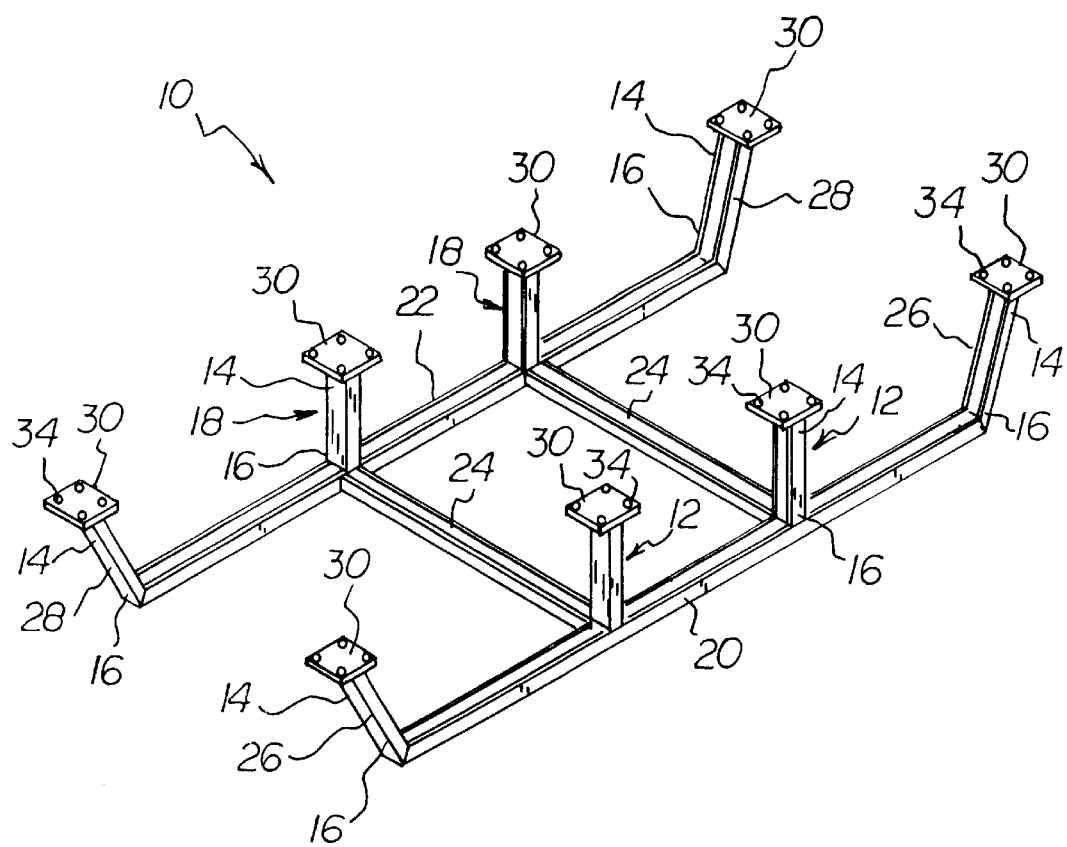
FIG. 5 is an top perspective view of the embodiment of the invention shown in FIGS. 1–4 removed from the trailer.

Turning to FIGS. 1–5, there is shown an exemplary embodiment of the trailer-mounted, side entry bar apparatus of the invention generally designated by reference numeral 10. In its preferred form, a side entry bar apparatus 10 is provided for mounting on a bottom of a trailer 11 and includes a first set of a plurality of first vertically oriented support bars 12, each of which has a top end 14 and a bottom end 16. A first longitudinally and horizontally oriented support bar 20 is connected to the respective bottom ends 16 of the first vertically oriented support bars 12. A second set of a plurality of second vertically oriented support bars 18 are provided, each of which has a top end 14 and a bottom end 16. A second longitudinally and horizontally oriented support bar 22 is connected to the respective bottom ends 16 of the second vertically oriented support bars 18. A plurality of transversely and horizontally oriented support bars 24 are connected between the first longitudinally and horizontally oriented support bar 20 and the second longitudinally and horizontally oriented support bar 22. A plurality of trailer attachment plates 30 are connected to the respective top ends 14 of the first vertically oriented support bars 12 and the second vertically oriented support bars 18. The respective support bars are connected together to form a rigid cage structure. The trailer attachment plates 30 facilitate retrofitting of the trailer-mounted, side entry bar apparatus of the invention to a conventional trailer.

The trailer 11 has a trailer width 13, and the transversely and horizontally oriented support bars 24 have a transverse bar length 15 which is less than the trailer width 13. As shown most specifically in FIG. 2, the transverse bar length 15 is only a small amount less than the trailer width 13. The small difference between the trailer width 13 and the transverse bar length 15 contributes to the effectiveness of the side entry bar apparatus 10 of the invention in preventing or barring a motor vehicle from entering the space under the floor of the trailer from the side of the trailer.

The bottom of the trailer floor 17 is spaced above the ground by a trailer floor height 19. The first vertically oriented support bars 12 and the second vertically oriented support bars 18 have a vertical bar height 21, and the vertical bar height 21 is less than the trailer floor height 19. Although the vertical bar height 21 is less than the trailer floor height 19, the difference between the vertical bar height 21 and the trailer floor height 19 is relatively small. The relatively small difference between the trailer floor height 19 and the vertical bar height 21 contributes to the effectiveness of the side entry bar apparatus 10 of the invention in preventing or barring a motor vehicle from entering the space under the floor of the trailer from the side of the trailer.

A first set of a plurality of first obliquely oriented support bars 26 can also be provided, each of which has a top end 14 and a bottom end 16. Bottom ends 16 of the first obliquely oriented support bars 26 are connected to opposite ends of the first longitudinally and horizontally oriented support bar 20. A second set of a plurality of second obliquely oriented support bars 28 can also be provided, each of which has a top end 14 and a bottom end 16. Bottom ends 16 of the second obliquely oriented support bars 28 are connected to opposite ends of the second longitudinally and horizontally oriented support bar 22. A plurality of additional trailer attachment plates 30 are connected to the respective top ends 14 of the first obliquely oriented support bars 26 and the second obliquely oriented support bars 28.

The respective lengths of the first longitudinally and horizontally oriented support bar 20, the first obliquely oriented support bars 26, the second longitudinally and horizontally oriented support bar 22, and the second obliquely oriented support bars 28 are selected so that, as shown in FIG. 1, the rear first obliquely oriented support bar 26 and the rear second obliquely oriented support bar 28 are relatively close to the rear wheels 23 of the trailer. Similarly, although not illustrated in FIG. 1, the front first obliquely oriented support bar 26 and the front second obliquely oriented support bar 28 are relatively close to the rear wheels of the tractor (not shown) which pulls the trailer 11. The relative closeness of the respective front and rear obliquely oriented support bars to respective tractor and trailer wheels also contributes to the effectiveness of the side entry bar apparatus 10 of the invention in preventing or barring a motor vehicle from entering the space under the floor of the trailer from the side of the trailer.

If desired, the first vertically oriented support bars 12, the second vertically oriented support bars 18, the first obliquely oriented support bars 26, and the second obliquely oriented support bars 28 can have adjustable lengths. Similarly, if desired, the first longitudinally and horizontally oriented support bar 20 and the second longitudinally and horizontally oriented support bar 22 can have adjustable lengths. When the respective bars have adjustable lengths, the side entry bar apparatus 10 of the invention can be installed on a wide variety and sizes of trailers 11. Respective adjustable length features can be implemented by having the respective bars in forms of two-piece telescopic assemblies.

The respective bars can be made from lightweight metal materials, and the respective bars can be welded to each other to form a strong overall rigid cage structure. Alternatively, the respective bars can be fixed to one another with bolts and nuts.

The trailer attachment plates 30 include bolt reception channels 34, and the trailer attachment plates 30 are attached to bottom portions of the trailer 11 using attachment bolts 32 that are threaded through the bolt reception channels 34.

The components of the trailer-mounted, side entry bar apparatus of the invention can be made from inexpensive and durable metal materials. Strong plastic materials can also be employed if desired.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved trailer-mounted, side entry bar apparatus that is low in cost, relatively simple in design and operation, and which may advantageously be used to prevent or bar a passenger automobile from sliding under the trailer during a crash between a passenger automobile and the trailer. With the invention, a trailer-mounted, side entry bar apparatus is provided which has provisions for modifying a trailer that has a single floor level to provide a barrier that extends below the middle portion of the trailer to prevent a vehicle from being driven under the trailer. With the invention, a trailer-mounted, side entry bar apparatus provides a side curtain of a trailer which is designed to withstand the impact of a vehicle that crashes into the side of the trailer. With the invention, a trailer-mounted, side entry bar apparatus is provided which includes transversely oriented members to resist a vehicle from moving under the trailer in a transverse direction. With the invention, a trailer-mounted, side entry bar apparatus is provided which is easily retrofitted to a conventional trailer. With the invention, a trailer-mounted, side entry bar apparatus is provided which includes elements that facilitate retrofitting to a conventional trailer.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

What is claimed as being new and desired to be protected by Letters Patent of the United States is as follows:

1. A side entry bar apparatus for mounting on a bottom of a trailer, comprising:
    a first set of a plurality of first vertically oriented support bars, each of which has a top end and a bottom end,
    a first longitudinally and horizontally oriented support bar connected to said respective bottom ends of said first vertically oriented support bars,
    a second set of a plurality of second vertically oriented support bars, each of which has a top end and a bottom end,
    a second longitudinally and horizontally oriented support bar connected to said respective bottom ends of said second vertically oriented support bars,
    a plurality of transversely and horizontally oriented support bars connected between said first longitudinally and horizontally oriented support bar and said second longitudinally and horizontally oriented support bar, and
    a plurality of trailer attachment plates connected to said respective top ends of said first vertically oriented support bars and said second vertically oriented support bars, said apparatus further including:
        a first set of a plurality of first obliquely oriented support bars, each of which has a top end and a bottom end, wherein bottom ends of said first obliquely oriented support bars are connected to opposite ends of said first longitudinally and horizontally oriented support bar,
        a second set of a plurality of second obliquely oriented support bars, each of which has a top end and a bottom end, wherein bottom end of said second obliquely oriented support bars are connected to opposite ends of said second longitudinally and horizontally oriented support bar, and
        a plurality of additional trailer attachment plates connected to said respective top ends of said first obliquely oriented support bars and said second obliquely oriented support bars, and
    wherein said plurality of transversely and horizontally oriented support bars connected between said first longitudinally and horizontally oriented support bar and said second longitudinally and horizontally oriented support bar are longitudinally spaced from each other and intermedially spaced from the opposite ends of said first longitudinally and horizontally oriented support bar and said second longitudinally and horizontally oriented support bar.

2. The apparatus of claim 1 wherein:
    the trailer has a trailer width, and said transversely and horizontally oriented support bars have a transverse bar length which is less than the trailer width.

3. The apparatus of claim 1 wherein:
    the bottom of the trailer floor is spaced above the ground by a trailer floor height,
    said first vertically oriented support bars and said second vertically oriented support bars have a vertical bar height, and
    said vertical bar height is less than said trailer floor height.

4. The apparatus of claim 1 wherein said trailer attachment plates include bolt reception channels, and wherein said trailer attachment plates are attached to bottom portions of the trailer using attachment bolts that are threaded through said bolt reception channels.

* * * * *